United States Patent [19]

Karowiec et al.

[11] 4,371,477

[45] Feb. 1, 1983

[54] DUST CONTROL UNIT

[75] Inventors: Krzysztof Karowiec; Janusz Sedlaczek, both of Gliwice; Alojzy Mura, Mysłowice; Jerzy Pawelczyk, Pyskowice; Zbigniew Skrzypiec, Katowice, all of Poland

[73] Assignee: Centrum Konstrukcyjno-Technologiczne Maszyn Gorniczych "Komag", Gliwice, Poland

[21] Appl. No.: 212,454

[22] Filed: Dec. 3, 1980

[30] Foreign Application Priority Data

Jan. 2, 1980 [PL] Poland .................................. 221153

[51] Int. Cl.[3] .............................................. B01D 47/08

[52] U.S. Cl. ........................................ 261/30; 55/230; 55/257 R; 55/414; 261/88

[58] Field of Search ...................... 55/230, 238, 257 R, 55/414, 257 C; 261/24, 30, 88, 90

[56] References Cited

U.S. PATENT DOCUMENTS

| | | | |
|---|---|---|---|
| 1,223,083 | 4/1917 | Lynn | 261/88 |
| 2,598,032 | 5/1952 | Blomen | 261/90 |
| 2,944,628 | 7/1960 | Sauter | 55/230 |
| 3,596,885 | 8/1971 | Stone | 55/230 |
| 3,698,158 | 10/1972 | Kinnebrew | 55/230 |

FOREIGN PATENT DOCUMENTS

| | | | |
|---|---|---|---|
| 589590 | 6/1925 | France | 261/30 |
| 575080 | 3/1958 | Italy | 55/230 |
| 388175 | 10/1973 | U.S.S.R. | 261/88 |

OTHER PUBLICATIONS

Control of Harmful Dust in Coal Mines, National Coal Board, Edition London 1973, pp. 25 and 26.

Miles, R. C., Venturis Ventilate and Control Dust, Coalage, Mar. 1979, pp. 84–90.

*Primary Examiner*—David L. Lacey

[57] ABSTRACT

This invention relates to a dust control device enabling dust to be wetted with water mist.

The device according to this invention has a water impeller 2 situated in a tunnel 11, 12 behind the fan impeller 1 when viewed upon in the air flow direction in the tunnel 11, 12.

The water impeller 2 has a water passage 13 with a suitable hole 5 on the circumference, said hole being situated transversally relative to the water passage 13 and being inclined at an angle $\alpha$ to the radial axis of the water impeller 2 opposed to the rotation of the said water impeller 2.

The described device is particularly useful in underground coal mines in places where coal is loaded from one conveyor onto another.

6 Claims, 6 Drawing Figures

DUST CONTROL UNIT

This invention relates to a device for the control of harmful dust by using an atomized water pattern.

In known devices for the control of harmful dust in mines, water is atomized by means of atomizing nozzles. At the end of the water tube there is mounted a nozzle with a small orifice through which water is ejected to the atmosphere. Small dimensions of the said orifice which is often additionally partly covered by an outlet deflector member ensures an atomized spray pattern. An improved version of the known device has been presented in 'Coal Age' of March 1979, No. 3, p. 84–90. In the device therein described the atomizing nozzle has been located in a reducing tube, particularly in a Venturi tube. The water spray ejected from the atomizing nozzle causes the air in the Venturi tube to move thus leading to a more efficient spraying and in consequence, to a more effective dust suppression.

Those skilled in the art should be aware of a more efficient spray device with radial ducts from the book by Z. Orzechowski entitled 'Liquid spray', PWN Scientific and Technical Publishers Edition, Warszawa 1976, p. 154. The atomizer described in this book is used for producing fuel mist in turbo-jet engines. The described atomizer is provided with a disc with radial ducts provided with radial outlets on the circumference of the disc. The said disc is mounted on a rotating shaft which simultaneously supplies atomized liquid to the disc ducts.

The aforesaid atomizer with radial ducts for turbo-jet engines is to be used in devices subjected to very great velocity of the air flowing around the disc. In consequence, it atomizes effectively the liquid only in devices such as turbo-jet engines, and cannot be used for such purpose as duct suppresion in mines. The reason for this is that the liquid is forced out from the atomizer with such force that at moderate air speeds used in the dust control units the drops of atomized water pass through the stream of flowing air and strike against the walls of the air supply tunnel. This causes an undesirable effect because some drops are not sufficiently atomized thus producing a water stream which is not taken away by the air stream. On the other hand, some other drops upon being detached from the wall are entrained by the air stream flowing through the tunnel of the dust control unit, but they are too small to ensure high dust control efficiency. Moreover, the drops thrown away from the wall are not uniformly distributed in the air stream which additionally lowers the dust control efficiency. The striking force of drops against the tunnel wall cannot be decreased by increasing the air flow speed in the tunnel, because this would lead to an unnecessary increase in the resistance of flow, noise and power consumption. Moreover, an excessive speed of air outflowing from the device would raise clouds of dust from the floor, roof and side walls.

A serious drawback of atomizing nozzles is an insufficient water atomization even in the case when pneumatic nozzles having atomizing nozzles mounted therein are used. The resulting water drops are too large so that a small number of droplets per unit volume of the air does not ensure a high wetting potential and an effective dust suppression.

This invention has been aimed as its principal object at the provision of a system for the control of harmful dust in coal mines, which can produce water mist and saturate the atmosphere in the mine therewith. The individual drops of that water mist are very small and, in consequence, they are densely distributed in the system per unit volume of the air. The system for the generation of the said water mist must be capable of dispersing it in the atmosphere of a mine in an air stream of a moderate velocity.

This aim has been achieved by means of a water impeller provided with radial ducts supplied with water and with an opening on the circumference directed tangentially to the rotary motion and opposite to the direction of the motion and deflected towards the centrifuging plane in conformity with the air flow direction. The said water impeller is mounted on a common shaft with the fan in a tunnel formed by the fan tunnel and motor tunnel behind the fan blades when viewed in the direction of the air flow, the said opening in the radial duct being located above the bottom of the fan impeller blades. Moreover, behind the water impeller there is a second impeller blade mounted on a common shaft with the former. The outer periphery of the blades of this impeller do not protrude beyond the surfaces of the hub of the fan impeller blade, the impeller blades being deflected toward a plane parallel to the water impeller and positioned at an angle similar to the angle of deflection of the radial duct hole. The device is provided with suitable guide vanes over the circumference of the tunnel above the bladed zone of the impeller. The said guide vanes are either flat, or bent and inclined in a direction opposite to that of the blades of the bladed impeller and have a densily perforated surface. In the end portion of each impeller tunnel there is a diffuser having a diameter greater than that of the impeller tunnel. The said diffuser is provided with suitable outlets over the circumference.

The objects of the invention are accomplished by the present invention, as more fully described hereinafter with reference to the drawings wherein.

Figure 1:
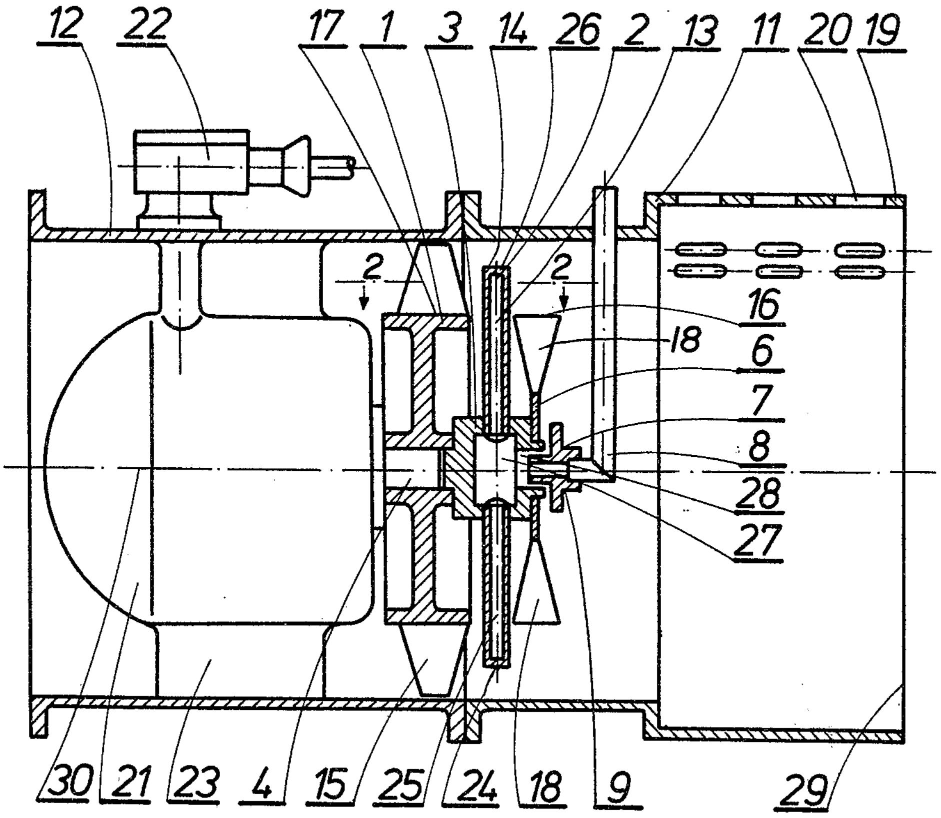
FIG. 1 is a longitudinal section, in elevation, through the device according to the present invention.
Figure 2:
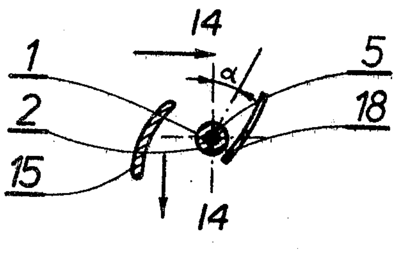
FIG. 2 is a partial cross-sectional view taken along lines 2—2 of FIG. 1 showing a fragment of the device of FIG. 1.
Figure 3:
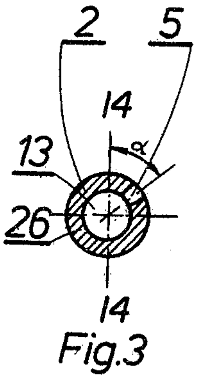
FIG. 3 is a cross section through arm 26.
Figure 5:
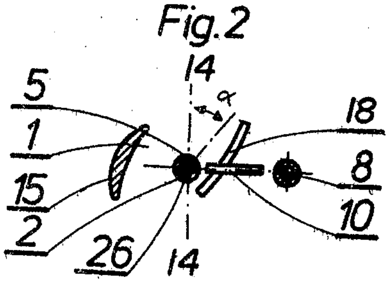
FIG. 5 is a partial cross-sectional view taken along line 5—5 of FIG. 4 showing a fragment of the device of FIG. 4, wherein the device is provided with flat guide vanes.
Figure 6:
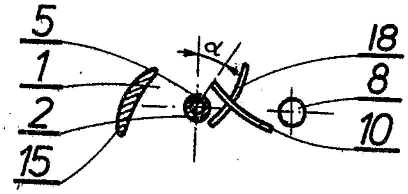
FIG. 6 is a similar partial cross-sectional view as in FIG. 5, but showing the device with bent guide vanes.
Figure 4:
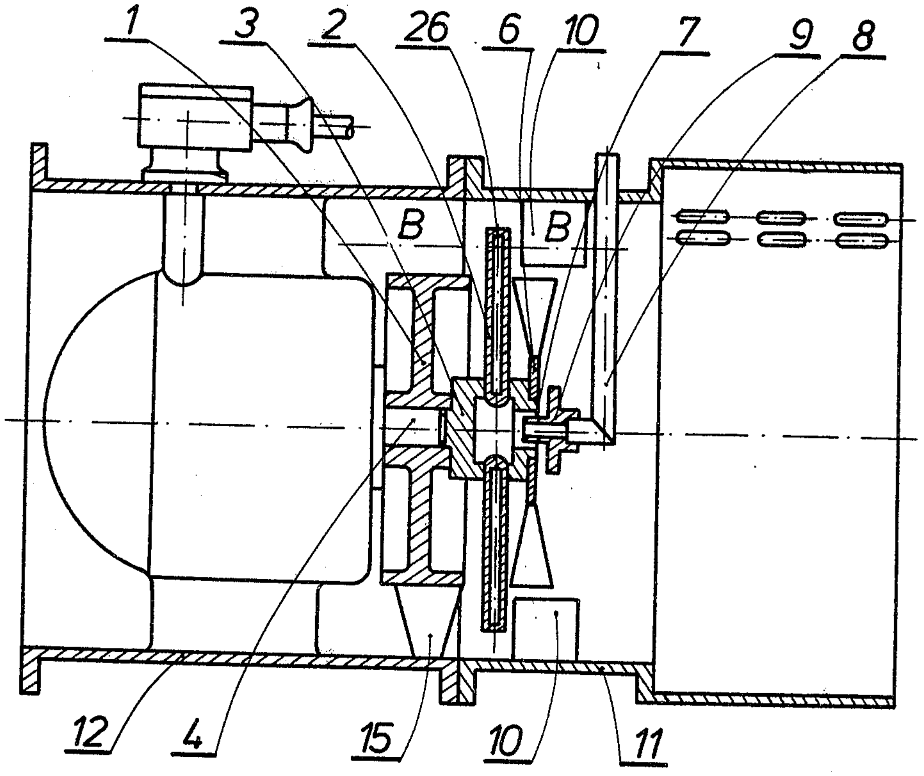
FIG. 4 is a longitudinal section, in elevation, corresponding to FIG. 1 but more precisely defining guide vanes 10.

The impeller tunnel 11 and motor tunnel 12 form a cylindrical duct terminating in a diffuser 19. Mounted along the axis of the motor tunnel 12 there is an electric motor 21 mounted in the said tunnel 12 on ribs 23. The said electric motor 21 is supplied with electric current via a junction box 22 located outside the motor tunnel 12.

On the shaft 4 of the electric motor 21 a fan impeller 1 is mounted. The said fan impeller 1 has blades 15 mounted on the surface 17. To the said fan impeller 1 the impeller hub 3 is secured provided with an inner chamber 27 and front outlet 28. On the circumference of the said hub 3 a water impeller 2 is mounted. The said water impeller 2 comprises at least one arm 26 radially mounted as shown in FIG. 1. The arm 26 is preferably in the form of a tube with a radially extending water duct 13 connected to the chamber 27 of the hub 3 of the water impeller 2. The water duct 13 is closed at the outer periphery of the above mentioned water impeller 2 and is provided with a hole 5. The said hole 5 is situated transversally relative to the water duct 13 and is inclined at an angle 2 towards the radial axis 14 of the water impeller 2 in the air flow direction. The hole 5 is also inclined in a direction opposite to the direction of rotation of the water impeller 2. (See FIGS. 2, 3, 5 and 6).

The hole 5 is situated behind the blades 15 and above the surface 17 of the blade bottom 15. Opposite to the arm 26 there is a counterbalancing arm 24 with a radial duct 25, being connected to the chamber 27. A bladed impeller 6 is mounted to the hub 3 of the water impeller 2 on the side of the diffuser 19. The bladed impeller 6 has blades 18 disposed to deflect the water outwardly from water impeller 2, their setting angle being similar to the angle $\alpha$ of hole 5. The outer peripheries of the blades 18 of impeller 6 are substantially aligned with the surface 17 of the blade bottom of the fan impeller 1. In the front opening 28 of the hub 3 there is an atomizing disc 9 forming a slot 7 in the outlet 28 connecting the chamber 27 to the inside of the impeller tunnel 11. The atomizing disc is mounted in the end portion of the tube 8. The system is provided with suitable guide vanes 10 provided with small through openings. The guide vanes 10 are situated on the inner circumference of the impeller tunnel 11 above the blade zone of the impeller 6 behind the water impeller 2 opposite to the air flow direction. The guide vanes 10 extend in the radial direction to the surface 17 of the blade bottom of the fan impeller 1. They are either flat and parallel to the axis 30 of the system, or bent relative to the direction of the air flow and inclined substantially transversally to the setting angle of the blades 18 or the bladed impeller 6 so that the projected contour thereof in cross-section intersects with the blade contour 18. The system is provided with a diffuser 19 in the shape of a cylinder with an inside diameter greater than that of the tunnels 11, 12 and with outlets 20 in the side wall.

Fan impeller 1 driven by electric motor 21 causes the air to move along the tunnels 11 and 12 toward the diffuser 19. The air stream flows around the arm 26 from which the water stream is discharged through outlet 5. This water is supplied by water tube 8 via the hub 3, chamber 27 and water passage 13. The water discharged from the outlet 5 is atomized into drops which are further atomized in a turbulent stream by the air flowing from the blades 15 of the fan impeller 1 and moved to the zone of rotation of the blades 18 of the bladed impeller 6. This impeller 6 produces an additional motion and an acceleration of the air stream, thus augmenting further atomization of water drops. Fine particles of water in the form of water mist are entrained by the stream of the air flowing through the tunnel 11 and carried away to the diffuser 19. In the said diffuser 19 the air stream enters the widening air duct because the diameter of the diffuser 19 exceeds that of the tunnel 11. An additional amount of air is thereby drawn into the said diffuser from the atmosphere due to the holes 20 situated in the side wall of the diffuser 19 which leads to a reduced condensation of water on the diffuser walls 19 and, at the same time, ensures protection against the rotating parts of the system. Moreover, the atmospheric air drawn into the system upon entering the diffuser 19 is partly cleaned from foreign matter as a result of contact with the stream of water mist flowing together with it toward the front outlet hole 29.

Pressurized water flowing from the tube 8 to the chamber 27 partly outflows inside the impeller tunnel 11 through the slot 7. In order to atomize this water and to obtain water mist the said slot 7 has been partly covered with an atomizing disc 9. Water after having left the disc 9 is entrained by the rotating air and the revolving hub 3 and impeller 6 and thrown away towards the tunnel wall 11. The water drops meet, on their way, with the turbulent air stream in the zone of the blades 18 and, then, with the air stream produced by the blades 15. In effect, they are atomized and mist is produced. In order to obtain better atomization and more effective water mist, the water stream after having left the outlet hole 5 comes up against the stationary guide vanes 10 mounted on the circumference of the tunnel 11 in the neighborhood of which arm 26 rotates thus forcing out the water stream through hole 5. The water stream falls onto the perforated guide vanes 10 and is atomized on their surface thus producing a fine mist.

The described device is especially useful in underground mines and can be installed in places where dust clouds appear. It is particularly useful in vicinity of the reloading stations where coal is reloaded from one conveyor onto another. The problem of dust control cannot be solved in this case by simply spraying the coal while being reloaded with a water stream, because the water used for spraying would accummulate on the floor. Moreover, experience has demonstrated that efficient dust suppresion would require such an enormous amount of water that a slurry could result over a considerable length of the area in the neighborhood of the reloading station. The application of the system according to this invention ensures a more effective precipitation of dust due to water mist and minimization of the amount of water and thus a reduced amount of mud on the floor in the dust control zone.

The device according to this invention can also be used in driving headings. In this case it produces a water mist curtain preventing the coal or stone dust from being spread from the site where the miner is working to more remote regions of the heading.

It can also be used in wall working as a subsidiary system co-acting with the spraying system of the miner. It will produce, in such a case, a water curtain preventing the dust from spreading from the wall working to near-by headings which could not be achieved by using known spraying system.

We claim:

1. An apparatus to control dust by wetting dust particles by means of a water mist, comprising in sequence an air fan impeller, a water-charged impeller having a radial duct terminating at the outer periphery thereof, and a further impeller, all said impellers being disposed on a common driving means and common hub means, all of said impellers being disposed in an air tunnel, the water impeller being provided with an outlet water passage situated above the hub means and disposed laterally relative to said radial duct and at an angle $\alpha$, in a direction toward said further impeller, the angle $\alpha$ being measured in a direction opposite to that of the rotation of the water impeller, said further impeller being a vane impeller, the outer diameter of the vanes of said vane impeller being less than that of the vanes of the air fan impeller, the vanes of the further impeller being disposed at an angle relative to the face of the water impeller, the disposed angle being substantially the same as the angle $\alpha$ of the outlet passage.

2. An apparatus as claimed in claim 1, wherein a cylindrical diffuser is positioned at the end of the tunnel, the inner diameter of the said cylindrical diffuser being larger than the inner diameter of the tunnel, said diffuser having holes provided in its side surface.

3. An apparatus as claimed in claim 2, wherein a stationary dispersion disk is arranged at the end of the outlet water passage, said water dispersion disk being positioned adjacent the hub means so as to define a slot cooperating with said impeller hub means.

4. An apparatus as claimed in claim 1, wherein guide vanes are arranged inside the tunnel and behind the water impeller, said guide vanes extending not beyond the hub means and being perforated to provide small ports.

5. An apparatus as claimed in claim 4, wherein flat guide vanes are arranged around the inside of the tunnel, said guide vanes being positioned in parallel to the longitudinal axis of the apparatus.

6. An apparatus as claimed in claim 4, wherein the guide vanes are curved and are laterally inclined relative to the vanes of the vaned impeller, the direction of discharge of the said guide vanes being substantially parallel with the longitudinal axis of the apparatus.

* * * * *